United States Patent [19]

Gonzalez

[11] Patent Number: 5,255,166

[45] Date of Patent: * Oct. 19, 1993

[54] APPARATUS FOR ILLUMINATING A VEHICLE LICENSE PLATE AND METHOD OF USING SAME

[76] Inventor: Jaime D. Gonzalez, 9390 Suva, Downey, Calif. 90240

[*] Notice: The portion of the term of this patent subsequent to Mar. 9, 2010 has been disclaimed.

[21] Appl. No.: 5,583

[22] Filed: Jan. 19, 1993

Related U.S. Application Data

[63] Continuation-in-part of Ser. No. 839,814, Feb. 21, 1992, Pat. No. 5,192,125, which is a continuation of Ser. No. 741,784, Aug. 6, 1991, Pat. No. 5,150,961.

[51] Int. Cl.⁵ .............................................. B60Q 1/56
[52] U.S. Cl. .................. 362/83.2; 362/216; 362/263; 40/204
[58] Field of Search ................. 362/80, 83.2, 216, 217, 362/263, 806, 812, 61; 40/204

[56] References Cited

U.S. PATENT DOCUMENTS 2,214,447  1/1939  Bave .
2,562,740  3/1948  Rizer .
2,618,089  9/1949  Rose .
2,689,948  10/1950 Rothman .
3,921,324  11/1975 Flannery .
4,727,459  2/1988  Palumbo .
4,857,890  8/1989  Solow .
5,029,053  7/1991  Solow .
5,156,455  10/1992 Kuo .

Primary Examiner—Richard R. Cole
Attorney, Agent, or Firm—Bernard L. Kleinke; Jerry R. Potts

[57] ABSTRACT

A new and improved apparatus for illuminating the rear portion of a vehicle and particularly the license plate of such a vehicle with a bright glowing light. The apparatus includes a transparent channel member for receiving a high voltage high frequency transformer and a single annularly shaped neon bulb therewithin for illumination purposes. The neon bulb is energized by the high voltage, high frequency transformer that is coupled to the vehicle electrical system by a low voltage high frequency power converter. The channel member is adapted to mounted adjacent to the license plate of a vehicle and scaled with a protective cover to help prevent accidental shock and to protect the bulb from exposure. The preferred method of using the apparatus is to connect the apparatus to the lighting system of the vehicle so that when the brake pedal of a vehicle is depressed, the low voltage power converter generates a source of low voltage high frequency electrical energy to power the high voltage transformer and in turn the associated neon bulb to augment the vehicle brake lighting system.

11 Claims, 3 Drawing Sheets

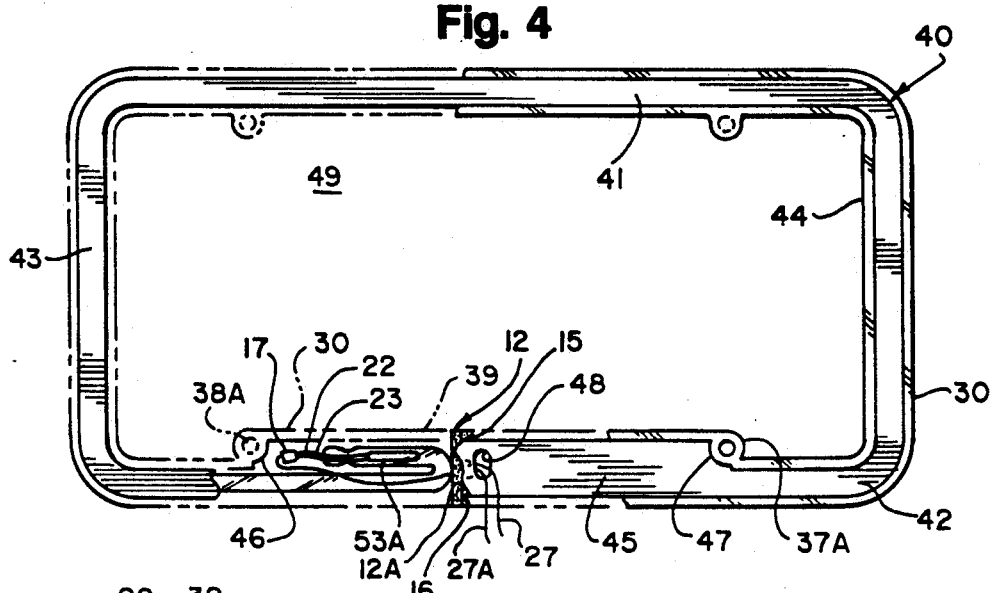
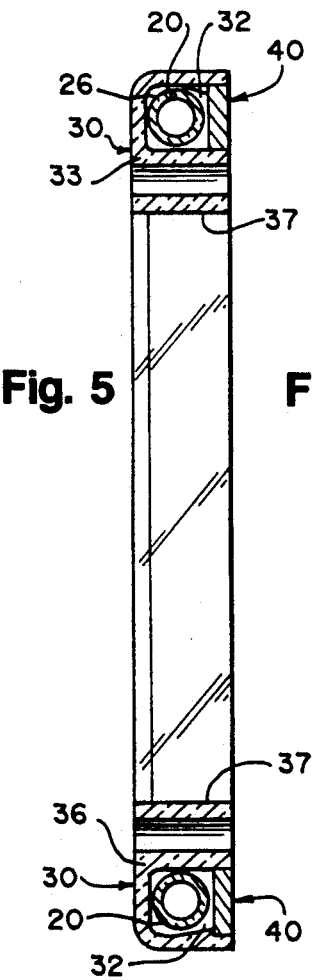
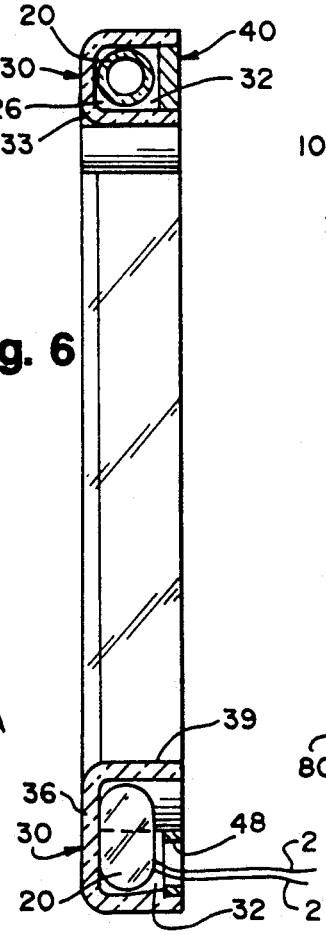
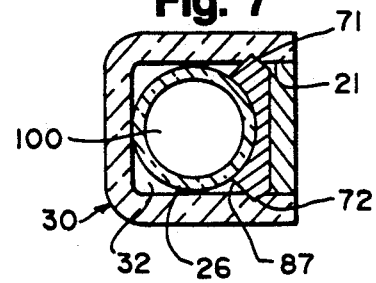
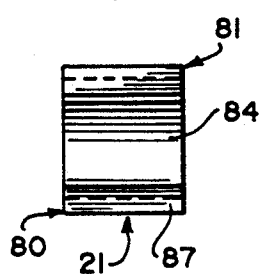
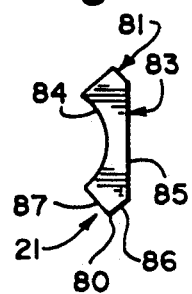

APPARATUS FOR ILLUMINATING A VEHICLE LICENSE PLATE AND METHOD OF USING SAME

CROSS-REFERENCE TO RELATED APPLICATIONS

This application is related to copending U.S. patent application 08/005,643 entitled "Neon Illuminating Apparatus and Method of Using Same," filed concurrently herewith on Jan. 19, 1993 and is a continuation-in-part of U.S. patent application No. 07/839,814 filed Feb. 21, 1992 now U.S. Pat. No. 5,192,125 which is a continuation of U.S. patent application 07/741,784 filed Aug. 6, 1991 now U.S. Pat. No. 5,150,961 which applications are commonly owned and incorporated herein by reference.

TECHNICAL FIELD

This invention relates in general to an illuminating apparatus and method of using same, and more particularly it relates to a method and apparatus for illuminating the rear portion of a vehicle and particularly the license plate of such a vehicle with a glowing bright light.

BACKGROUND ART

Tail lights and brake lights have been standard equipment on automobiles since the 1920's. While the automobile has become an improved mode of transportation over the years, little overall improvement has been made in the brightness and quality of most automobile tail and brake lights. In this regard, most, if not all vehicle tail and brake light assemblies employ incandescent lamps with diffusion covers for illuminating the rear of a vehicle. Thus, the need for a clear, distinct and brighter rear automobile lighting system is more important now than ever.

One attempt at solving the above mentioned problem has been to enhance the illumination of the rear portion of vehicles, through an additional rear brake assembly which is added by automobile manufacturers, and many automobile owners, to make the rear section of a vehicle more apparent to other drivers approaching from the rear. Also, modern legislation has also required such a third brake light to be added for this purpose. While such assemblies generally illuminate the rear of a vehicle with a greater amount of diffused light, such lighting systems still employ incandescent lamps and thus, are not clearer, brighter and more distinctive than the other light which presently illuminate the tail section of current automobiles.

Therefore, it would be highly desirable to have a much brighter, clearer and more distinct apparatus and method for illuminating the rear portion of a vehicle. Such a lighting apparatus should not merely diffuse light, but should produce a very distinctive glowing, halo effect that would be immediately apparent to another driver approaching the vehicle.

One such brighter, more distinctive light is produced by neon. However, neon bulbs are typically operated from high voltage, high current electrical sources that are not readily available in conventional automobile electrical systems. Moreover, even if such a high voltage source were available, the routing of high voltage cables throughout the rear of a vehicle would be extremely dangerous.

Because of the importance of sufficiently lighting the rear portion of a vehicle, a distinct challenge is presented for developing a very bright, relatively safe alternative illumination method for use on present day vehicles.

The evolution of automobile and truck engineering from the relatively elementary machines of yesterday to the complex vehicles of today, has been one of the most significant occurrences of this century. At the same time, there has been an immense increase in the volume of traffic on the highways, roads and streets of the United States during the same period. Because of the sheer volume of traffic and the cost and complexity of automobile and truck engineering, the emphasis of a large part of current automobile and truck engineering, is on the safety and reliability of the vehicles.

Nowhere is this emphasis more evident than in the area of automobile and truck lighting systems. In the early days of automobile manufacture, there were no headlights or tail-lights installed on vehicles. Brake lights, turn signal lights, reflectors, reverse and side warning lights, which are standard equipment on the vehicles of today were totally unheard of in the beginning of the auto industry.

However, several decades ago, as the number of automobiles and the amount of driving increased, the installation of headlights, tail and brake lights became a necessity as the driving public developed a strong interest in attempting to avoid accidents whenever possible. In this regard, the installation of tail and brake lights on such vehicles served to warn drivers of the presence of other vehicles in front of them, and the possibility other vehicles may make sudden and unexpected stops ahead.

While such brake and tail light systems served to provide warnings for the drivers of such vehicles, several problems emerged with the use of such brake and tail lights. In this regard, as the emphasis on style and appearance of vehicle design became important, the size of both tail and brake lights became smaller in many instances, and thus, more difficult to observe.

For example, in snowstorms, fog or rain, the visibility of brake and tail lights can be greatly diminished, so the likelihood of serious accidents is increased greatly.

The most serious problem with such light warning systems occur at night when it becomes more difficult for drivers to distinguish between tail and brake lights particularly, in the case of sudden and unexpected stops. In this regard, the danger of sudden stops and the inability of a driver to distinguish between tail and brake lights, coupled with the other problems mentioned above resulted in the above-mentioned safety legislation requiring that new model automobiles be equipment with a third separate brake light to help improve driver awareness of stopping vehicles.

The use of such a third brake light has proven highly beneficial in helping to prevent many costly and injurious rear end collisions. The success of such a third light is based upon its location, which unlike a traditional brake light configuration is positioned centrally disposed between the vehicle rear lights. In this centrally disposed position a driver approaching the rear of another vehicle is much less likely to confuse the taillights and brake lights of the vehicle. Moreover, by employing a third brake light that is usually energized independently of the other tail and brake lights, a fail safe feature is developed so if the other brake lights fail the third light will continue to operate. Thus, the third brake light greatly enhances the visibility of the vehicle from the rear and is a valuable addition to enhancing the safety of auto and truck operation.

Despite the many advantages of such a third brake light, a significant problem for manufacturers has developed relative to the location of such a light. In this regard, placing such a light between the rear window and the front edge of the trunk lid opening has proven to be very costly in that the light had to be mounted on the back of the automobile. Moreover, the placing of the lighting assembly in the rear window portion of the vehicle is not aesthetically pleasing and tends to block the rear view of the driver of a vehicle equipped with such an assembly. Thus, present construction requiring such a light to be placed in a housing mounted inside the vehicle in a secure manner serves to make the third brake light not only an expensive addition requiring installation by skilled and trained personnel but also posed a potential hazard.

Another problem associated with positioning such a third light inside the vehicle is that many new vehicles have tinted rear window glass to protect the driver and passengers from glare and to provide privacy to the occupants of the vehicle. In addition, certain other vehicle rear windows contain elaborate designs and distracting logos, which are either appended to or built into the rear window. Such tinted glass and window drawings therefore greatly impair the visibility of the third brake light for other drivers approaching the vehicle, particularly during daytime driving.

Therefore it would be highly desirable to have a new and improved apparatus and method of using it for illuminating the rear of a vehicle with a bright glowing light that would be relatively inexpensive and easy to install, that would be highly visible and that would not impair the view of a driver.

Because of the above mentioned problem several solutions have been proposed to find a less costly and more visible illuminating methods and apparatus.

One such attempt is shown in U.S. Pat. No. 4,857,890 that discloses a license plate holder equipped with a plurality of spaced apart incandescent lamps for reflecting light through a red lens frame material similar to the lens material of a conventional automobile taillight. In this arrangement, the incandescent lamps turn on each time the brake pedal is depressed to augment the normal brake light warning signals. While such an arrangement solves many of the above mentioned problems it has not proven to be totally satisfactory. In this regard, the incandescent lights are connected in series causing the entire lighting arrangement to fail should any one of the lamps fail. In addition because such lamps are spaced apart and very small they have proven to be less than satisfactory for warning purposes.

Another attempt is shown in U.S. patent application 07/839,814 that discloses a license plate holder with a single neon tube for providing a source of bright glowing light to illuminate the vehicle license plate and a rear portion of the motor vehicle. In this arrangement a low voltage high frequency transformer is mounted in the trunk of the vehicle and is coupled to a high voltage high frequency transformer mounted within a tube holder secured to the rear of the vehicle. While this method has proven highly successful it would be highly desirable to have an improved method and apparatus for illuminating the rear of a vehicle that would not require the mounting of a special power supply within the trunk of the motor vehicle, that would be safe and that would brightly illuminate the rear of the motor vehicle.

DISCLOSURE OF INVENTION

It is the principal object of this invention to provide a new and improved illuminating apparatus and method of using it to provide a highly visible glowing bright light for helping to alert drivers of a stopping vehicle.

It is a further object of the present invention to provide such a new and improved illuminating apparatus which can be easily and quickly installed by relatively unskilled and untrained personnel.

Another object of the present invention is to provide such an illuminating apparatus and method which is relatively inexpensive to manufacture and install and that can be utilized with relative safety on both new and old vehicles.

Briefly, the above and further objects of the present invention are realized by providing a new and improved apparatus for illuminating the rear portion of a vehicle and particularly the license plate of the vehicle. The apparatus includes a transparent channel member for receiving a low voltage high frequency power system having a high voltage high frequency transformer and a single annularly shaped neon bulb therewithin for illuminating the rear of the vehicle and its license plate with a bright glowing light. The neon bulb is energized by the high voltage, high frequency transformer that is coupled to the vehicle electrical system by a low voltage high frequency power supply. The channel member is adapted to mounted adjacent to the license plate of a vehicle and sealed with a protective cover to help prevent accidental electrical shock.

The preferred method of using the apparatus is to connect the apparatus to the lighting system of the vehicle. In this regard, when the brake pedal of a vehicle is depressed, the low voltage power supply generates a source of low voltage high frequency electrical energy, which powers the high voltage transformer and in turn, the associated neon bulb to augment the vehicle brake lighting system.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 4 is a rear elevational view of the license plate frame assembly of FIG. 1;

FIG. 5 is a cross-sectional view of the license plate frame assembly of FIG. 3 taken substantially along lines 5—5;

FIG. 6 is a cross-sectional view of the license plate frame assembly of FIG. 3 taken substantially along lines 6—6;

FIG. 7 is a cross-sectional view of the license plate frame assembly of FIG. 3 taken substantially along lines 7—7;

FIG. 8 is a front elevation view of a retaining clip of FIG. 7;

FIG. 9 is a side elevational view of the retaining clip of FIG. 8; and

BEST MODE FOR CARRYING OUT THE INVENTION

Figure 1:
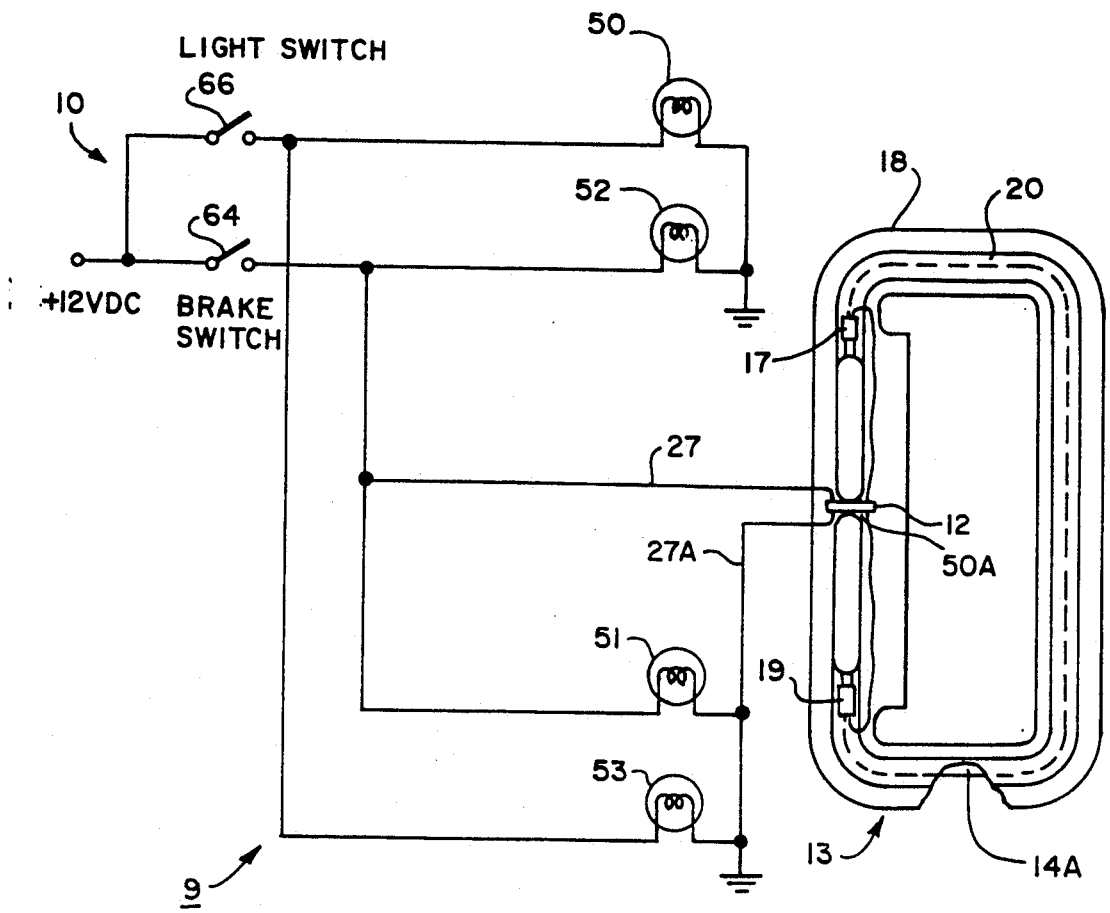
FIG. 1 is a diagrammatic schematic view of a luminous license plate apparatus which is constructed in accordance with the present invention and which is shown operatively coupled to the electrical system of a motor vehicle.

Referring now to the drawings and more particularly to FIG. 1 thereof there is shown a novel luminous license plate assembly apparatus 9 which is constructed in accordance with the present invention and which is operatively coupled to the electrical system 10 of a motor vehicle 14. The luminous license plate apparatus 9 generally comprises a license plate frame assembly 13 having a single annularly shaped neon tube 20 for illuminating the rear portion of the motor vehicle 14 and a low voltage high frequency power system 12 for energizing electrically the neon tube 20. The low voltage high frequency power system 12 is powered by the electrical system 10 of the motor vehicle 14. As best seen in FIG. IA, the frame assembly 13 is adapted to be mounted in centrally disposed location adjacent a rear license plate 14A of the vehicle 14. In this regard, the assembly 13 is mounted to the rear of the vehicle 14 using a set of mounting bolts, (not shown) that are also employed for mounting the rear license 14A to the vehicle.

Figure 2:
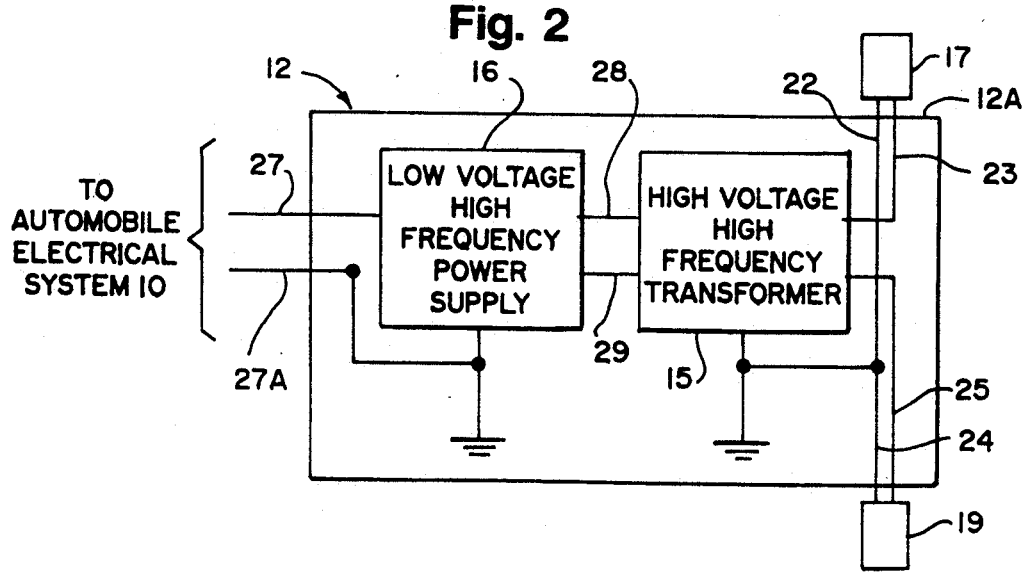
FIG. 2 is a diagrammatic diagram of a low voltage high frequency power system for energizing a neon tube of FIG. 1.
Figure 1A:
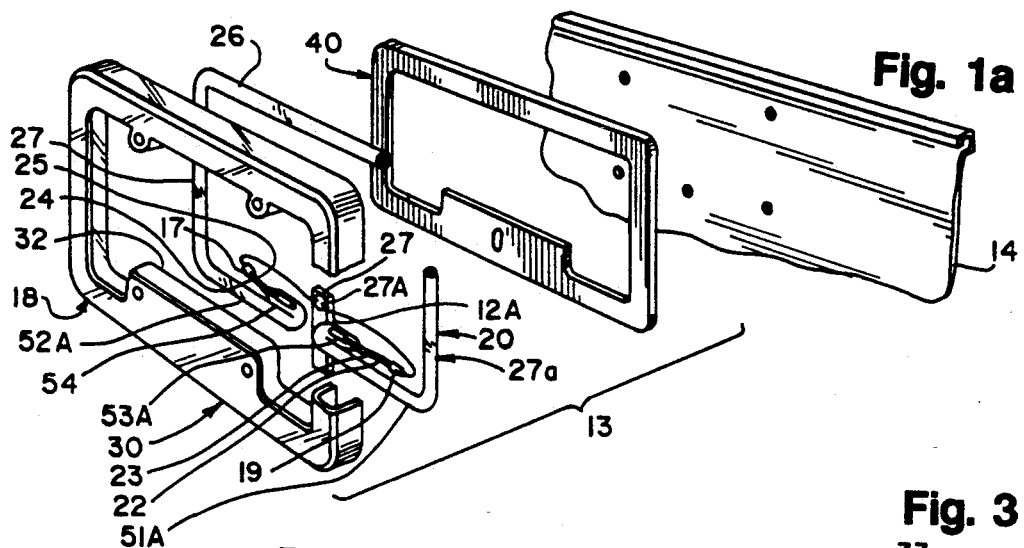
FIG. 1A is a partial fragmentary exploded pictorial view of a license plate frame assembly of FIG. 1, and which is shown illustratively, relative to a rear portion of a vehicle to which the assembly is to be mounted.

Considering now the assembly 13 in greater detail with reference to FIGS. 1 and 2, the assembly 13 generally comprises the neon tube 20 and a neon tube holder 18 for supporting the neon tube 20 in a stationary manner relative to the license plate of the vehicle 14. The neon tube 20 is received within the holder 18 and is secured removably therein by a set of spaced apart retaining clips, such as a clip 21 (FIGS. 7, 8 and 9).

While in the preferred form of the invention the holder is shown mounted to the rear of a motor vehicle for illuminating a license plate, it will be understood by those skilled in the art that the holder and tube can be configured in different shapes and can be mounted on various other locations on the vehicle for illumination purposes.

Considering now the low voltage high frequency power system 12 in greater detail with reference to FIGS. 1 and 2, the system 12 generally includes a small high voltage high frequency transformer 15 for supplying high voltage power to the neon tube 20, and a small low voltage high frequency power converter 16 for energizing the high voltage high frequency transformer 15. The power supply 16 and the high voltage high frequency transformer 15 are disposed on a small printed circuit board 12A (FIG. 2). As will be explained hereinafter, the printed circuit board 12A is adapted to be mounted within a small space disposed with the tube holder 18. A pair of conductors 28 and 29 interconnect the power converter 16 with the transformer 15. In this regard, the transformer 15 includes a primary winding (not shown) coupled to the power converter 16 via the conductors 28 and 29. The conductors 28 and 29 carry low voltage high frequency power only and are only energized when the power converter 16 is energized by the electrical system 10 of the motor vehicle.

The neon tube 20 includes a set of high voltage electrodes 22-25 which are adapted to be connected to the output winding of the transformer 15 by a pair of high voltage connectors 17 and 19 respectively.

In operation the power converter 16 is energized by a hot line conductor 27 connected in series with the vehicle brake line system that includes a pair of rim brake lights or incandescent bulbs 51A and 52A respectively. In this regard, the neon tube 20 will be energized whenever the user of the vehicle actuates a brake switch 64 connecting the vehicle's electrical power to the power converter 16. In this mode of operation the tube 20 functions as a third brake light disposed between the normal rear brake lights 51A and 52A of the vehicle 14.

Although in the preferred mode of operation, the power converter 16 is energized by the brake light power circuit, it will be understood by those skilled in the art that the power converter 16 could also be connected to the rear tail light circuit comprised of a light switch 66 and a pair of tail lights or incandescent bulbs 50 and 53 respectively. In this mode of operation the neon bulb 20 would be energized whenever the user of the vehicle actuates the head lights of the vehicle 14, thus enabling the license plate to be more easily identified by law enforcement personnel.

Considering now the tube holder 18 in greater detail with reference to FIGS. 1-7, the tube holder 18 generally comprises a front transparent channel member 30 for receiving and supporting the neon tube 20 in a stationary manner relative to the license plate of the vehicle 14 and a rear protective cover plate 40 that encloses the neon tube 20 and low voltage high frequency power system 12 within the channel member 30 thus preventing a user from making contact accidentally with the high voltage electrodes 22-25. As best seen in FIGS. 5 and 6, the rear cover plate 40 is dimensioned to engage matingly a tube receiving channel 32 disposed within channel member 30 in order to seal the neon tube 20 and low voltage high frequency power system 12 within channel 32. As will be explained hereinafter in greater detail, the channel member 30 and the cover plate 40 are secured removably together by the mounting bolts, which affix the license plate 14A and the tube holder 18 to the rear of the vehicle 14.

Considering now the channel member 30 in greater detail with reference to FIGS. 3, 5-7, the channel member 30 is of unitary construction and is composed of a transparent plastic material. The channel member 30 is generally rectangular in shape to define a centrally disposed open space 31 that is substantially smaller than a vehicle license plate. In order to enable the neon bulb 20 to fully illuminate the license plate of the vehicle 14, the channel member 30 is dimensioned to be substantially larger than the license plate of the vehicle so the license plate will be completely outlined by the neon bulb 20 when the bulb 20 and license plate are adjacent to one another relative to the holder 18.

Figure 3:
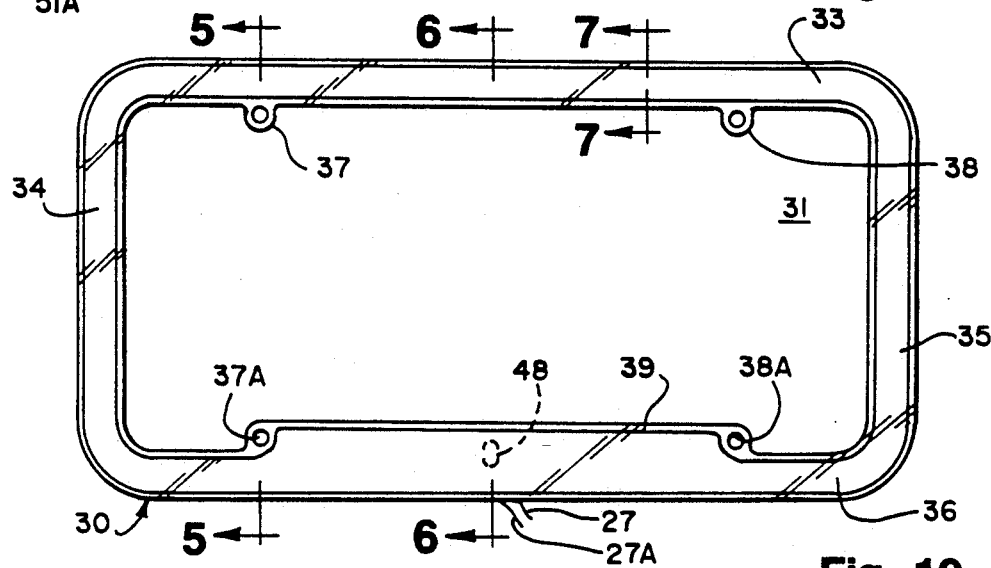
FIG. 3 is a front elevational view of the license plate frame assembly of FIG. 1.

As best seen in FIGS. 1 and 3, the channel member 30 generally includes an upper leg portion 33 that is integrally connected between a pair of side leg portions 34 and 35 that are disposed parallel to one another and a lower leg portion 36 that is integrally connected between the opposite terminal ends of side leg portions 34 and 35. The leg portions 33-36 are generally U-shaped in cross section for defining the tube receiving channel 32 that extends around the entire periphery of the channel member 30.

For the purpose of mounting the license plate 14A to the channel member 30, the upper leg portion 33 includes a pair of spaced-apart apertured bolt receiving members 37 and 38. The bolt receiving members 37 and 38 are integrally connected to the upper leg portion 33 and depend within the space 31. A corresponding pair of bolt receiving members 37A and 38A are integrally connected to the lower leg portion 36 and extend into the space 31 in alignment with members 37 and 38, respectively. The bolt receiving members 37, 37A, 38 and 38A are configured to be in substantial alignment with the mounting holes of a conventional license plate.

In order to accommodate the electrodes 22–25 within the channel 32, the lower leg portion 36 forms a hollow protuberance 39 that is centrally disposed between side leg portions 34 and 36. The protuberance 39 is U-shape in cross section and is sufficiently dimensioned to receive the end portions of the neon tube 20 which are substantially wider than the other portions of the tube 20. In this regard, the protuberance has a transverse dimension that is about twice the transverse dimension of the other leg members, such as the leg member 33.

As best seen in FIGS. 3 and 7, the channel member 30 also includes a plurality of spaced apart slots, such as slots 71 and 72 that are disposed within the leg portions, such as leg portion 33. The slots, such as slots 71 and 72 are adapted for receiving individual ones of the retaining clips, such as the retaining clip 21.

Considering now the protective cover plate 40 in greater detail with reference to FIGS. 1, 2 and 8, the protective plate 40 has a unitary construction and is adapted to engage matingly the channel member 30. In this regard, the plate 40 seals the high voltage neon tube 20 within the channel 32 to prevent the electrodes of the tube from making contact with the vehicle 14. The cover plate 40 is generally a flat body member configured in a generally rectangular shape for defining an opening 49. The center plate 40 is dimensioned to be received within the channel 32 for helping to secure the neon tube 20 therewithin. The cover plate 40 includes a upper leg member 41, a lower leg member 42 and a pair of side leg members 43 and 44 that are integrally connected to both the upper leg member 41 and the lower leg member 42. The lower leg member 42 includes a centrally disposed raised portion 45 that is dimensioned to close that portion of the channel 32 bounded by the protuberance 39. The raised portion 45 is generally rectangular in shape. The right and left sides of the raised portion are truncated to form a pair of notches 46 and 47 for engaging matingly the outer surface of bolt receiving members 37A and 38A respectively. In this regard, the notches 46 and 47 are complementarily shaped to a portion of members 38A and 37A respectively. The raised portion 45 includes a centrally disposed cylindrically shaped aperture 48 having a sufficient diameter to permit the conductor cord 28 to pass therethrough.

As best seen in FIG. 7, when the protective cover plate 40 is received within the channel 32, the cover plate 40 abuts against the retaining clips, such as the clip 21 and is secured (by means not shown) within the channel member 30.

The retaining clip 21 is designed to hold the cover to the tube receiving channel which contains the neon tube and is clipped to the outside of the upper cover on the bottom and top lips of the upper portion of the cover.

Considering now the neon tube 20 in greater detail with reference to FIGS. 1, 5, 6 and 7, the neon tube 20 is composed of a transparent material, such as glass and is generally rectangular in shape. The hollow portion of the tube is sealed and is filled with a gas 100 such as neon gas that can be ionized by a high current charge. While neon is the preferred gas it will be understood by those skilled in the art that other gases, such as argon can also be used. The tube has a upper leg member 26 which is integrally connected between a left leg member 27 and a right leg member 28. The lower portion of the tube 20 includes a pair of spaced apart straight leg portions 51A and 52A which are integrally connected to the right leg member 27 and the left leg member 28 respectively. As shown in FIG. 1, the opposite ends of leg portions 51A and 52A terminate in a pair of spaced apart U-shaped end portions 53A and 54A respectively for defining a small space indicated generally at 50A therebetween. In this regard, the space 50A is sufficiently large to permit the printed circuit board 12A to be mounted therein without obstructing any of the light emitted from the tube 20 from radiating out of the holder 18.

The U shape portions 53A and 54 are sealed at their terminal ends and have extending therefrom the electrode terminals 22, 23 and 24, 25 respectively. The electrode terminals 22–25 are in turn coupled to the low voltage high frequency power system 12 via the transformer 15.

Considering now the retaining clip 21 in greater detail with reference to FIGS. 7–9, the retaining clip 21 is of a unitary construction and is composed of a resilient plastic material which is sufficiently flexible to enable the retaining clip 21 to be easily installed and removed from the slots 71 and 72. The retaining clip 21 includes a pair of slot engaging portions 80 and 81 respectively that are complementarily shaped to the slots disposed in the channel member 30, such as the slots 71 and 72. The slot engaging portions 80 and 81 are integrally connected to a centrally disposed body portion 83 that is adapted for engaging matingly a portion of the neon tube 20. In this regard when a clip, such as the clip 21 is received within the slots 71 and 72 it wedges the tube 20 securely within the channel 32.

Considering now the retaining clip 21 in still greater detail, the body member 83 in cross section generally includes a curved leg portion 84 having a radius that is substantially the same as the radius of the upper leg member 26 of the tube 20 for engaging the tube 20 matingly. The body member 83 also includes a straight leg 85 which is disposed substantially opposite the curved leg portion 84 and has a dimension that is about the same as the height of channel 32. The straight leg portion 85 is adapted to abut flatly against the cover plate 40 when its received with channel 32. The slot engaging portions 80 and 81 are substantially similar, so only the portion 80 will be described. Considering now the slit engaging portion 80 in greater detail with reference to FIGS. 7–9, the slot engaging portion 80 in cross section generally includes a short leg portion 86 and a long leg portions 87. The short leg portion is integrally connected to the straight leg portion 85 at about an angle of 45°. Similarly, the long leg portion 87 is integrally connected to the curved leg portion 84 at about an angle of 45°.

Considering now the high frequency high frequency high voltage transformer 15 in greater detail with reference to FIG. 2, the high frequency high voltage transformer 15 is coupled between the low voltage high frequency power converter 16 and the high voltage connectors 17 and 19. In this regard, the transformer 15 has a pair of hot conductors 23 and 25 connected across its output winding and interconnected to the connectors 17 and 25 respectively. Each of the connectors 17 and 25 include ground returns via a pair of conductors 22 and 24 respectively.

The transformer 15 is small in size and is adapted to be mounted to the printed circuit board 12A (FIG. 4). The transformer converts 12 VAC power to 2000 VAC power. It is manufactured and sold by Neonize which has a place of business in Huntington Park, California.

Considering now the low voltage high frequency power converter 16 in greater detail with reference to FIG. 2, the power converter 16 is adapted to be coupled between the electrical system 10 of the motor vehicle via the hot and ground conductor 27 and 27A respectively and the high voltage high frequency transformer 15 via the conductors 28 and 29. The power converter is small in size and is adapted to be mounted to the printed circuit board 12A. The power converter 16 converts 12 VDC power to 12 VAC power. The power converter 16 is more fully described in copending U.S. patent application Ser. No. 08/005,643.

Considering now the printed circuit board 12A in greater detail with reference to FIG. 4, the printed circuit board 12A is adapted to be mounted by means (not shown) within the protuberance 39 of the holder 18. In one form of the present invention, the board 12A is mounted within the small space 50A transversely to the U shaped portions 53A and 54 of the tube 20. In this arrangement, substantially all of the light emitted from the tube 20 is able to radiate from the holder 18.

Figure 10:
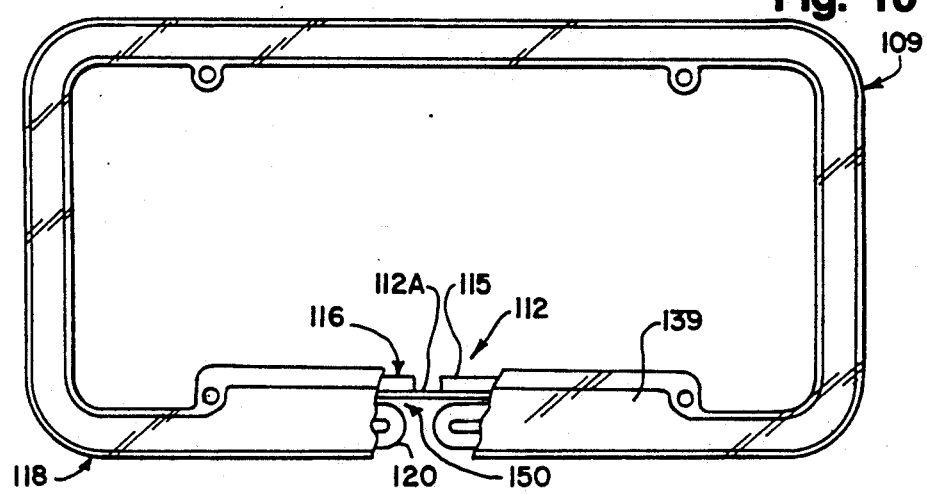
FIG. 10 is a luminous license plate apparatus which is constructed in accordance with the present invention.

Referring now to FIG. 10, another luminous license plate assembly apparatus 109 which is constructed in accordance with the present invention. Apparatus 109 is substantially similar to apparatus 9 except as to the positioning of the power system.

Considering now the apparatus 109 in greater detail, the apparatus 109 includes a rectangularly shaped non tube holder 118 and neon tube 120 assembled in a manner similar to the apparatus 9. A low voltage high frequency power system 112 including a high voltage high frequency transformer 115, and a low voltage high frequency power converter 116 both being mounted on, a printed circuit board 112A. The printed circuit board 112A is mounted within a protuberance 139 of a tube holder 118.

The tube holder 118 is substantially similar to tube holder 18. In this regard, the printed circuit board 112A is mounted by means (not shown) within a small space 150 disposed in an upper portion of the protuberance 139. In this arrangement, the printed circuit board 112A is disposed above the neon tube 120 to permit a substantial portion of the light from tube 120 to be radiated downwardly and outwardly from the holder 118. In this regard, the board 112A is affixed by means (not shown) within the protuberance 139, and spans the ends of the tube 120 at the inner side thereof.

While in the preferred form of the invention, the board 112A is mounted above the tube 120, it will be understood by those skilled in the art that the shape of the end portions of the tube 120 may be configured to permit the board 112A to be mounted below the tube 120 in order to permit a substantial portion of the light from end portions of the tube 120 to be radiated upwardly and outwardly from the holder 118.

From the foregoing, it should be understood the location of the printed circuit board 112A should be arranged to help illuminate a license plate (not shown) mounted to the holder 118 and to assure the low voltage high frequency power system 112 is electrically insulated within the holder 118 to prevent a user from being electrocuted by the high voltage generated by the system 112.

While a particular embodiment of the present invention has been disclosed, it is to be understood that various different modifications are possible and are contemplated within the true spirit and scope of the appended claims. There is no intention, therefore, of limitations to the exact abstract or disclosure herein presented.

What is claimed is:

1. An illuminating apparatus for use with the electrical system of a motor vehicle, comprising:

hollow tube means having a gas disposed therewithin for providing a source of bright glowing light, said tube means having a set of spaced apart electrodes;

a small sized printed circuit board disposed near said hollow tube means for electrical device mounting thereon;

power means mounted to said printed circuit board and coupled to the electrical system of the motor vehicle for receiving direct current power from the motor vehicle;

high-voltage high-frequency transformer means mounted to said printed circuit board and responsive to said power means for providing high-voltage electrical power to energize said tube means;

low-voltage conductor means for helping to couple said high voltage high frequency transforming means to the electrical system of the motor vehicle;

tube holder means adapted to be mounted to the motor vehicle for receiving and supporting said tube means in a stationary manner relative to the motor vehicle;

means defining a small space for receiving said printed circuit board within said tube holder means; and nonconductive protective cover means for insulating said tube means and said high-voltage high-frequency transformer means within said tube holder means to substantially prevent electrical short circuit between said high-voltage high-frequency transformer means and the motor vehicle.

2. An illuminating apparatus according to claim 1, wherein said tube means is neon tube means.

3. An illuminating apparatus according to claim 1, wherein said neon tube means is a single neon tube having electrode means adapted to be electrically connected to said high-voltage high-frequency transformer means.

4. An illuminating apparatus according to claim 1, wherein said tube holder means includes open channel means for defining a tube receiving channel.

5. An illuminating apparatus according to claim 4, wherein said channel means is substantially rectangular in shape.

6. An illuminating apparatus according to claim 4, wherein said nonconductive protective cover means is dimensioned to cover said tube receiving channel.

7. An illuminating apparatus according to claim 6, wherein said protective cover means includes means defining an aperture for permitting a portion of said low-voltage conductor means to pass therethrough to help couple said tube means to the electrical system of the automobile.

8. An illuminating apparatus according to claim 4, wherein said tube holder means is composed of a transparent plastic material.

9. An illuminating device according to claim 1, wherein said gas is neon or argon.

10. An illuminating device according to claim 1, wherein said gas is argon.

11. A method of using an illuminating apparatus for illuminating a portion of a vehicle, said vehicle having an electrical system, comprising:

mounting tube holder means to a desired portion of the vehicle;

placing hollow tube means having a set of electrodes in said tube holder means;

connecting a set of conductors to said electrodes;

connecting the free end of said conductors to a high-frequency, high-voltage transformer;

mounting said transformer adjacent to hollow tube means in said tube holder means;

passing connector means coupled to said transformer through and aperture disposed within a cover plate;

engaging said tube holder means with said cover plate to seal the hollow tube means and high voltage transformer within said tube holder; and coupling said conductor means to the electrical system of the vehicle.

* * * * *